(No Model.)

W. W. BARBOUR.
GRAIN BUTTER FOR HARVESTERS.

No. 471,165.        Patented Mar. 22, 1892.

Witnesses:
Walter S. Wood
Marian Longyear

Inventor.
Wallace W. Barbour
By Lucius C. West
Att'y.

UNITED STATES PATENT OFFICE.

WALLACE W. BARBOUR, OF ALAMO, MICHIGAN.

GRAIN-BUTTER FOR HARVESTER.

SPECIFICATION forming part of Letters Patent No. 471,165, dated March 22, 1892.

Application filed November 4, 1891. Serial No. 410,827. (No model.)

*To all whom it may concern:*

Be it known that I, WALLACE W. BARBOUR, a citizen of the United States, residing at Alamo, county of Kalamazoo, State of Michigan, have invented a new and useful Grain-Butter for Harvesters, of which the following is a specification.

This invention relates to harvesting-machines which elevate the grain and deliver it down a short downwardly-inclined binder-deck to the binding-needle and knotter.

The object of this invention is to provide this inclined binder-deck referred to with an oscillating butter which will act upon the butts of the grain to make and keep them even before and while being bound into a bundle.

Figure 1:
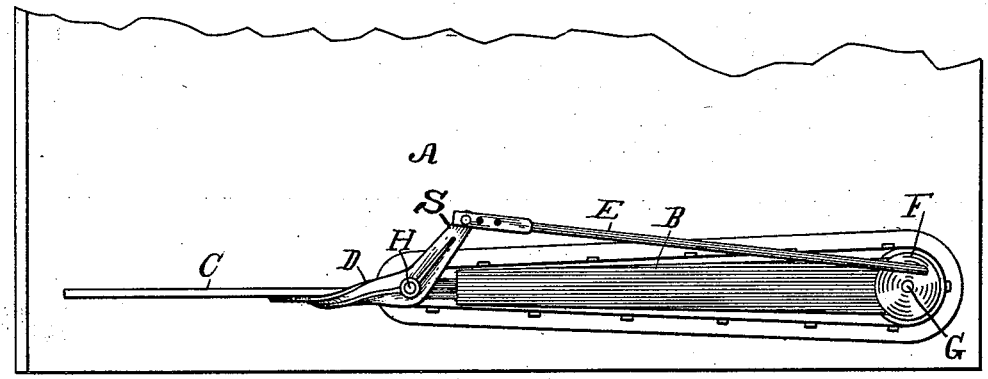
Figure 2:
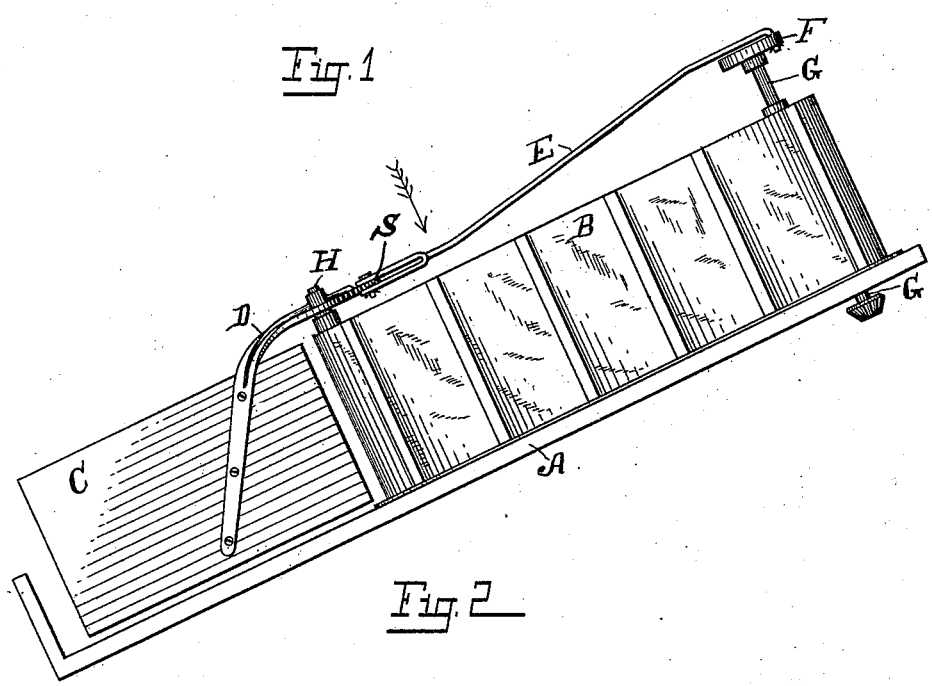

In the drawings forming a part of this specification, Figure 1 is a plan view, and Fig. 2 a side elevation of Fig. 1.

Referring to the lettered parts of the drawings, A is a broken portion of the floor of the downwardly-inclined binder-deck, which in use receives the grain onto its upper end, (right-hand end in the drawings,) which grain is elevated by an upwardly-inclined carrier (not shown) from the grain-platform of the harvesting-machine. No harvesting-machine is here shown, neither is the upwardly-inclined grain-carrier which leads from said machine to the upper end of the downwardly-inclined binder-deck here shown, as before stated; but it will be readily understood that the harvester and the upwardly-inclined carrier would be located at the right of Fig. 2. While the binder-deck is described as being on a downward incline, it may be at any other angle, so far as the operation of the butter is concerned.

At B is an endless belt carried by upright shafts H and G, said shafts having bearings in the floor A of the binder-deck and projecting upwardly therefrom. Heretofore this endless belt contacting with the butts of the grain which was carried down the floor A (by some suitable carrier-belt not here shown) was supposed to have been sufficient to keep the butts of the grain even until the bundle was bound, which binding takes place at or near the terminus of the lower end of the endless belt B; but I have found it beneficial to employ an oscillating butter at this point, where the binding needle and knotter are located, (said binding-needle and knotter not being here shown,) in order to even the grain before binding and keep it even while being bound. To this end I employ the wing C, made from a flat piece of wood or other material. To this wing I attach one arm of a bell-crank D, giving said arm a quarter-twist just above the wing, so that that part of the bell-crank which is not attached to the wing will extend over the upper end of the upright shaft H, to which shaft H said bell-crank is pivoted. To the upper end of the upright shaft G is attached a crank-disk F, and to this crank-disk and to the free arm of the bell-crank is pivotally connected the ends of a connecting-rod E. This free arm of the bell-crank is shown at S.

In the operation, power having been applied to the shaft G, the wing C will oscillate and strike against the butts of the grain, which has been delivered beyond the end of the endless belt B.

Having thus described my invention, what I claim as new, and desire to secure by Letters Patent of the United States, is—

1. In a grain-harvester, the combination of the binder-deck next to the binding-needle, which deck has an endless belt arranged edgewise at its side, a laterally-oscillating wing beyond the end of said belt toward the binding-needle, and operating means connecting said wing with the driving-shaft of the endless belt, substantially as set forth.

2. In a grain-harvester, a binder-deck having an endless belt arranged edgewise at its side, said belt being carried by two shafts projecting upward from the platform of said deck, a laterally-oscillating wing at the end of the endless belt toward the binding-needle, a bell-crank pivoted to one of said upright shafts, one arm of said bell-crank being attached to the wing, a crank-disk attached to the other upright shaft, and a connecting-rod pivotally attached at the ends to said crank-disk and to the free arm of the bell-crank, substantially as set forth.

In testimony to the foregoing I have hereunto subscribed my name in the presence of two witnesses.

WALLACE W. BARBOUR.

Witnesses:
I. E. SELKIRK,
A. O. LEGG.